United States Patent [19]

Goetz et al.

[11] 4,394,033

[45] Jul. 19, 1983

[54] TEMPERATURE COMPENSATING ELASTIC CONE

[75] Inventors: George W. Goetz, Detroit; Arne J. Santti, Lapeer; Gary R. LaLonde, Sterling Heights, all of Mich.

[73] Assignee: The Firestone Tire & Rubber Company, Akron, Ohio

[21] Appl. No.: 238,318

[22] Filed: Feb. 26, 1981

[51] Int. Cl.³ ............................................ B60R 21/08
[52] U.S. Cl. ................................. 280/736; 280/740; 280/742; 422/113; 422/116
[58] Field of Search ............... 280/736, 737, 738, 739, 280/740, 741, 742; 422/113, 166, 167; 137/854

[56] References Cited

U.S. PATENT DOCUMENTS

| | | | |
|---|---|---|---|
| 3,747,953 | 7/1973 | Goes et al. | 280/739 |
| 4,158,696 | 6/1979 | Wilhelm | 280/736 |
| 4,191,392 | 3/1980 | Barnett | 280/740 |
| 4,218,407 | 8/1980 | Robertson | 137/854 |

FOREIGN PATENT DOCUMENTS 1420340  1/1976  United Kingdom ............... 280/738

*Primary Examiner*—David M. Mitchell
*Assistant Examiner*—Kenneth R. Rice
*Attorney, Agent, or Firm*—Olaf Nielsen

[57] ABSTRACT

In an inflatable occupant-restraint system in a vehicle, a generator for producing fluid under pressure is so placed that a portion of the generator is outside the cushion and has a resilient venting means for dumping increasing fractions of gas volume outside the cushion at increasing operating temperatures.

1 Claim, 5 Drawing Figures

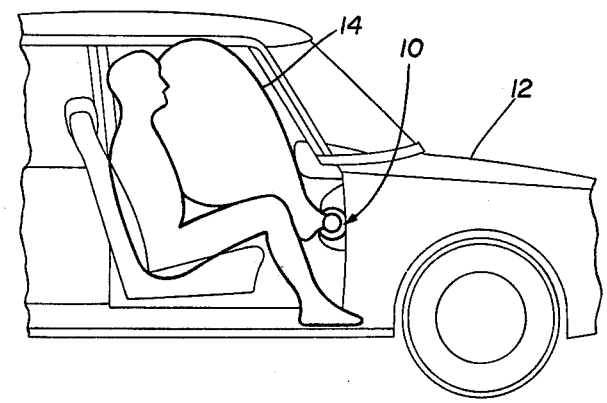
FIG. 1
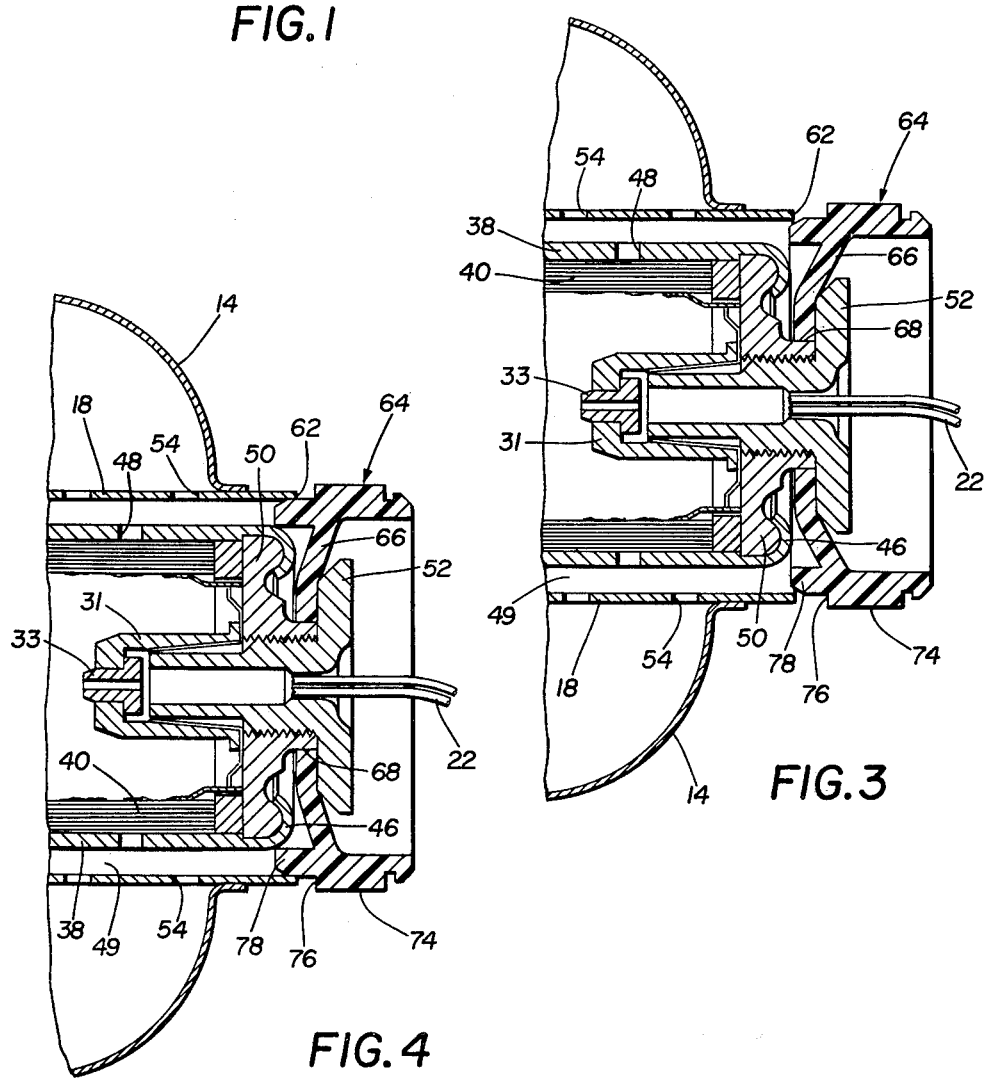
FIG. 3
FIG. 4

TEMPERATURE COMPENSATING ELASTIC CONE

BACKGROUND OF THE INVENTION

One type of passive restraint for safeguarding automotive passengers from injury is the inflatable envelope or cushion which, in the event of a collision, is filled by an inert gas generated through the controlled combustion of a solid chemical.

Whereas relatively compact gas-generating units are used for restraints facing the driver in the case of an accident, larger cylindrical generators are used for the passenger-side which utilize means for diffusing the generated gas in advance of inflating the envelope.

The generator typically comprises a main chemical generant or propellant in, for example, pressed pellet form, packed in a cylindrical canister and surrounding a booster charge. An igniter responds to a signal from a collision-sensor and causes an ignition cord within the booster to fire the booster which, in turn, ignites the propellant. The gas generated by the propellant is filtered, cooled, and passed through ports in a surrounding gas diffuser into the restraint cushion, typically a fine-mesh nylon bag.

The volume, pressure and temperature of the gas at various stages during the very brief time interval between the sensing of a crash and the full deployment of the cushion, as well as rates of ignition, burning, and gas-generation may be tailored by means well-known within the art.

It is known that, in general, as the ambient temperature increases, the burn-rate of a solid propellant tends to increase. The effect of this increase in burn-rate is that the gases are produced at a much higher volumetric rate. Consequently, at the higher ambient temperatures, the system operates at higher pressures, and the deployment velocity of the cushion increases.

Additionally, as the propellant and filter become heated, the temperature, and hence the volume, of the delivered gas is increased. It is therefore desirable that the tailored operation of the gas generator proceed as uniformly as possible, whether under hot or cold ambient temperatures, i.e. with a minimal spread between resulting hot and cold operating conditions.

Although it is known, as for example through U.S. Pat. No. 4,191,392 to Barnett, to provide a vent at one end of the gas generator in order to prevent gas pressure build-up at that end, such vent merely redirects pressure, so that it still enters the cushion, but through the vent at the end of the generator rather than through the ports in the diffuser.

Such venting does not, however, contemplate the varying conditions of ambient temperature and gas flow rate which may obtain at the particular moment when firing takes place.

SUMMARY OF THE INVENTION

This invention solves the above problem by providing a gas-generator having temperature-compensating means for directing an increasing fraction of gas-volume overboard, i.e., outside the cushion, as the ambient temperature increases. There is accordingly provided on the generator a cap or cone whose flexibility varies with temperature, and which opens increasingly in response to pressure with a rise in temperature. In this manner, the performance variation between hot and cold operation is minimized.

BRIEF DESCRIPTION OF THE DRAWINGS

FIG. 1 is a schematic side view of the front seat of an automobile, showing the generator, with the associated inflated cushion in place.

FIG. 3 is a view similar to FIG. 2, but showing the venting action by the end cone of the invention upon the generator firing.

FIG. 4, is a view similar to FIG. 2, but with the vent cone of the invention in the process of reseating itself.

DETAILED DESCRIPTION

FIG. 1 shows generally the environment of the present invention, the generator 10 shown in cross-section within the front compartment of a vehicle 12, with the associated cushion 14 in inflated operative condition.

Figure 2:
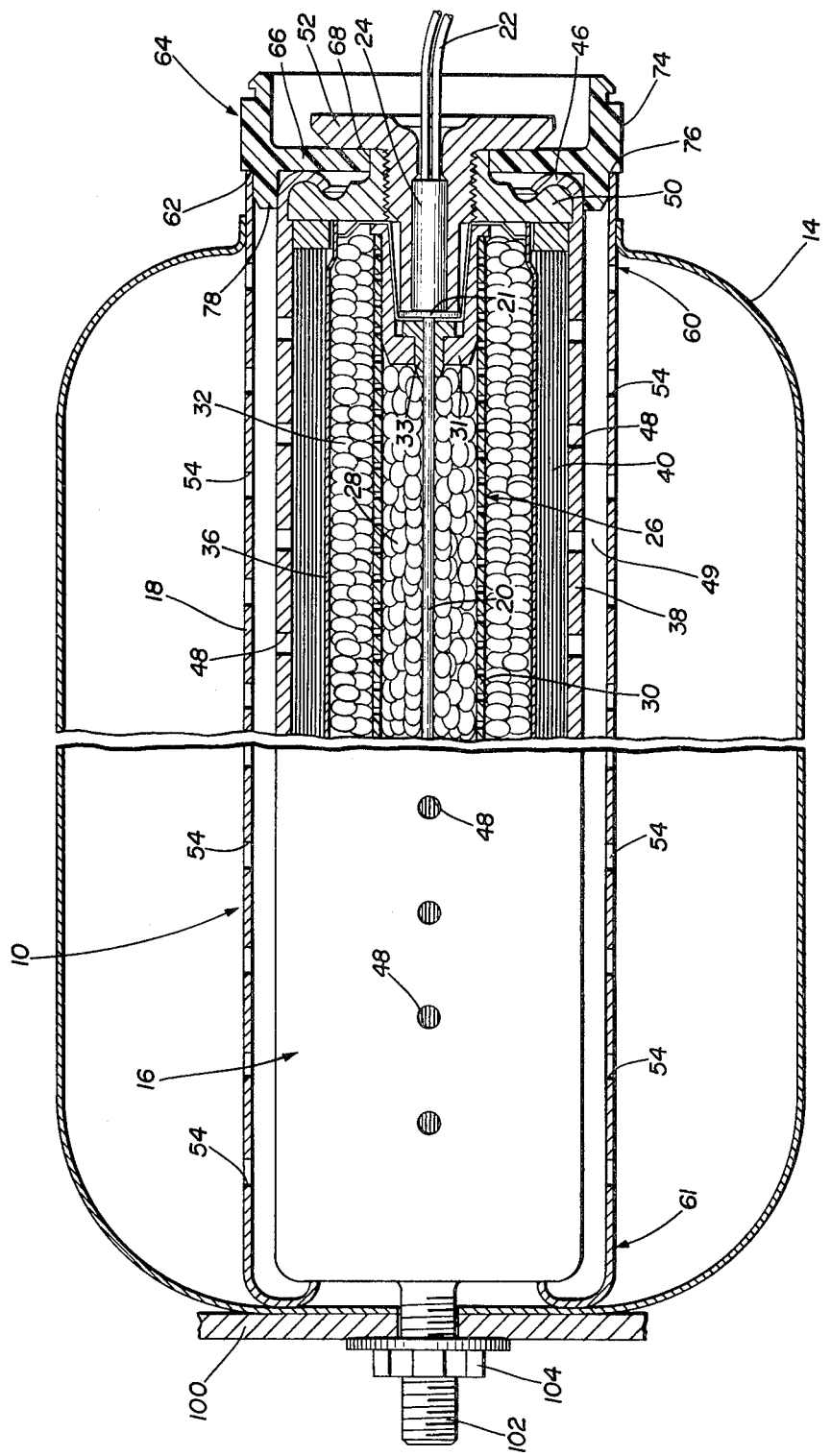
FIG. 2 is a cross-sectional view of a portion of the gas-generator, at the instant before ignition.

As shown in FIG. 2, the generator 10 comprises a generally cylindrical inflator 16 lodged within a diffuser 18, both of a length generally several times greater than their diameter.

Extending axially through the center of the inflator 16 is an ignition cord 20 which may be fired by the ignitor or squib 24, upon activation through electric wires 22. The ignitor is separated from cord 20 by a plate 21. Surrounding the ignition cord 20 is a booster 26 comprised of pellets 28 of a rapidly-burning chemical housed within a perforated booster casing or tube 30. A booster tube-end cap 31 and a grommet 33 locate the end of cord 20.

The main propellant comprises pellets 32 packed around the booster tube 30 and within a tubular propellant canister 36. Typically, such propellant pellets will be pressed from granules of a gas-generating composition comprised for example of sodium azide and metal oxide. Between propellant canister 36 and an outer inflator housing 38, perforated as at 48, is located an annular filter 40 for screening undesirable materials from the combustion products produced during firing. Such filters are well-known and may include combinations of perforated metal, screening, glass fibers, steel-wool, etc.

The ends of the inflator housing 38, generally of light metal, are turned radially inwardly as at 46, sealingly engaging an inflator housing cap 50, which receives ignitor housing 52 and simultaneously seals the parts of the inflator 16.

Surrounding the inflator housing 38 is a cylindrical metal diffuser 18 having perforations 54 spaced circumferentially and longitudinally thereof, and giving access to the interior of the cushion 14, which may comprise a fine-mesh material, and is sealed by means not shown against the outer surface of the diffuser near its end 60.

At one end 60 of the diffuser 18, its edge 62 is engaged by a vent cone or cap 64. The cone 64 comprises a radial disk or web portion 66 apertured at 68 to fit around a portion of the inflator housing cap 50 and retained between inflator housing cap 50 and ignitor housing 52. The cone 64 is made of a material whose flexibility increases with temperature.

The disk 66 terminates at its outer radial edge in an annular rim portion 74. The portion of the rim facing the diffuser cylinder is notched axially and radially as at 76 to sealingly accommodate the diffuser edge 62. Radially inwardly of the notch 76 is an annular lip 78 which fits slidingly between the radially inner surface of the diffuser 18 and the radially outer surface of the inflator housing 38.

At the opposite end of the generator, the end 61 of the diffuser 10 may be drawn against a portion of the support housing 100 by means of stud 102 and nut 104 on inflator housing 38, also trapping and sealing the wall of cushion 14. The major portion of the generator 10 will thus be located internally of the cushion 14, with the vent cone 64 extending outside the cushion.

Additional stud-nut combinations, not shown, may help anchor the generator.

OPERATION

A crash sensor will, by means of wires 22, igniter 24 and ignition cord 20, ignite the booster charge 28 which, in turn, fires the main propellant 32. The gases created by the ignition and subsequent burning flow outwardly through filter 40, where undesirables are removed. The cleansed gas emerging from filter 40 exits the inflator housing 38 through perforations 48 and flows into chamber 49 between the inflator housing 38 and the diffuser 18.

The gas within chamber 49 will seek to escape through the diffuser perforations 54, while also acting axially against the vent cone lip 78 and the cone-web 66.

Where the device is working in the higher temperature range, with the attendant increased propellant burn-rate and increased volumetric rate of gas-production, such higher temperature will increase the flexing tendency of the cone-web 66, and allow the increased pressure in chamber 49 to move the notch 76 of the rim 74 axially from its normally sealed position against the diffuser edge 62.

So long as the pressure within the diffuser 18 remains greater than the ratio between the force on the vent cone lip 78 and its exposed annular area, the vent cone 64 will remain open as in FIG. 3. Once the pressure becomes equal to or smaller than this ratio, the cone will close as seen in FIG. 4.

In this manner a certain fraction of the increased gas volume is caused to vent out of generator, outside the cushion 14, while the remainder exits the perforations 54 to fill the cushion.

The material of the cone 64 and its physical dimensions are so chosen as to provide a venting device which is more easily displaced from its seat at higher temperatures than at low ones. Accordingly, at lower temperatures, the cone remains sealed in place against edge 62 but, in the nature of a pressure safety relief valve, opens to vent gas in increasing amounts at higher and higher temperatures.

Figure 5:
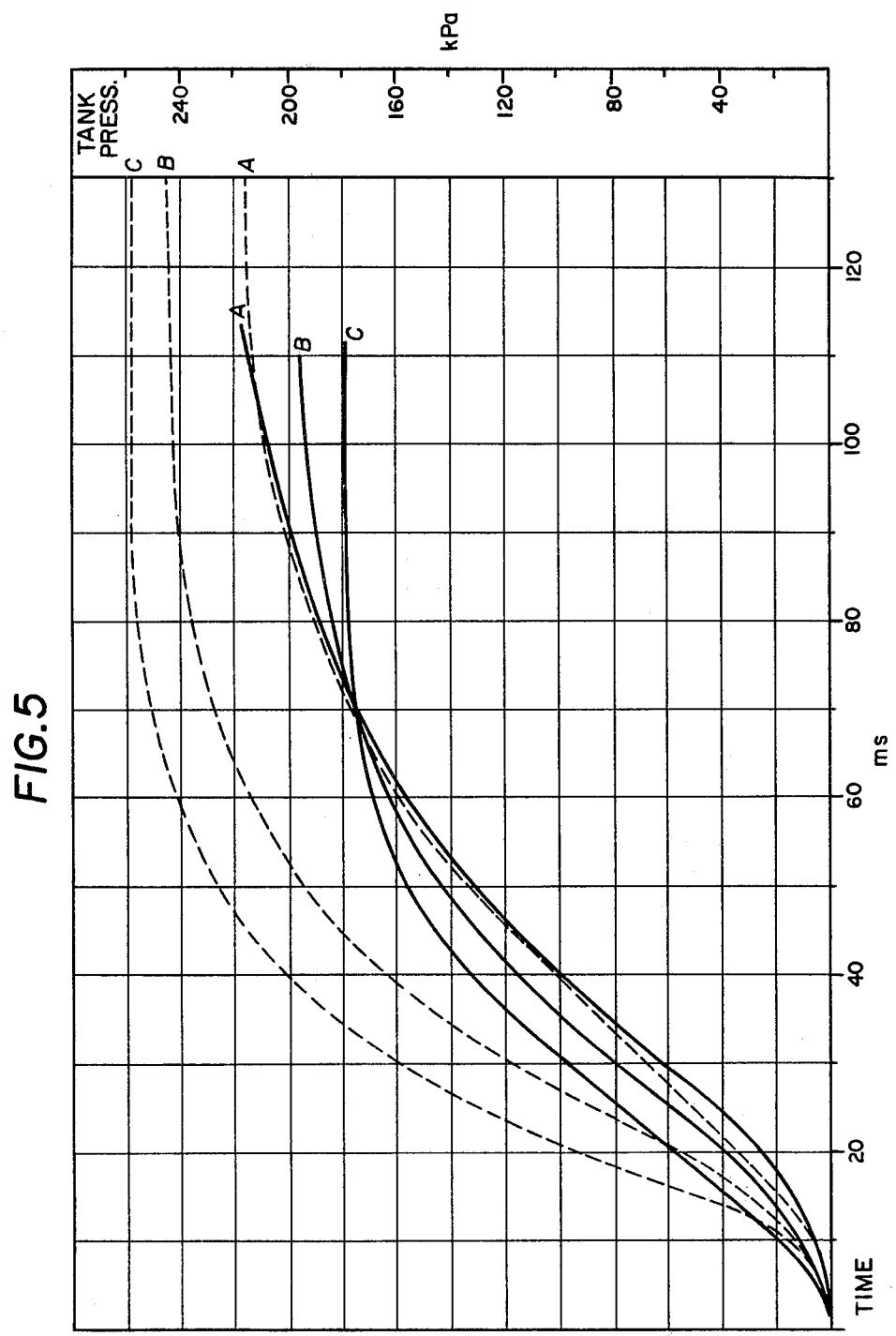
FIG. 5 is a graph comparing the vented device of the invention with an unvented control device.

FIG. 5 is a graph showing the traces of actual tests comparing the performance of the vent cone inflators of the invention, shown in the full-line curves, with that of unvented inflators, shown in the dashed-line curves. The devices were placed in turn in a 10.3 ft.$^3$ (292,000 cm$^3$) test-tank, simulating the cushion, with instrumentation to trace the gas-pressure in kilo-pascales (kPa) from the instant of firing well beyond 100 milli-seconds (ms). While the entire unvented device was located inside the test-tank, the vented device was placed with the diffuser end 60 outside the test-tank. It should be noted that 140 kPa represents the tank pressure which is considered equivalent to full cushion deployment.

In order to show the superiority of the invention, each device to be fired was first stabilized for a minimum of four hours at a specific temperature: those compared in the A-curves were cooled down to a temperature of $-20°$ F. ($-28.9°$ C.); the B-curve devices were brought to a room temperature of 70° F. (21.1° C.); and those of the C-curve were heated to 180° F. (82° C.).

The three curves of the inventive devices will be seen to track within a very narrow band. With a vented cold device, the time, from firing until a tank gas-pressure of 140 kPa is reached, varies by only 12 ms from that for a vented hot device; the unvented device, on the other hand, exhibits a 26 ms variation.

It will be seen that, for the inventive generator, operating pressures are reached within approximately 42 ms in a hot device, and in about 54 ms in a cold device. In the prior art control device, the 140 kPa level is reached in about 27 ms when hot, but not until 53 ms when cold.

For the unvented device, it will be seen from the curves of FIG. 5 that the maximum hot-to-cold output pressure difference occurring at about the 40 ms point, is about 100 kPa, which represents approximately 40% of the maximum tank pressure of 246 kPa at room temperature. For the vented device of the invention, the ratio of the maximum difference between hot and cold pressures, to the maximum tank pressure at room temperature, is seen to be less than half of the above percentage. Since the ideal system would exhibit no pressure difference between hot and cold operation, and thus a 0 percentage, the lower percentage of the device of the invention indicates an improvement.

A typical device tested comprised a unit measuring about 55 centimeters (cm) in length and about 8 cm in diameter.

The ignition system consists of an igniter cord 20 such as manufactured by Explosives Technology, Fairfield, Calif., under the designation ITLX; the cord is fired by, for example, a titanium potassium chlorate igniter or squib 24 such as manufactured by Imperial Chemicals Industries. The booster mixture comprised sodium azide and potassium perchlorate, formed into pellets 28, and contained within a perforated envelope 30. The propellant 32, also in pellet form, comprised sodium azide and iron oxide.

The vent cone 64 was made of nylon whose web 66 had a thickness of about 6 millimeters (mm); the annular rim portion 74 has a thickness of about 7 mm. The cone sealing portion which faces the axial end 62 of the diffuser 18 has an area of about 10 cm$^2$, compared to a total area of all diffuser vents of about 15 cm$^2$. When the gas pressure thus rises to a point where it moves the vent cone from its seat, the vent area will be increased by about 67%.

The vent cone may be made of other materials such as, for example, polyester; it will be seen that different venting characteristics may be had by varying the material, the shape, or the dimensions of the cone; as well as by varying the pressures delivered by the inflator through changes in ignition and propellant chemistry, and in filter-, canister-, housing-, and diffuser-design.

We claim:
1. A passive occupant-restraint system comprising
 (a) an inflatable cushion,
 (b) a fluid generator operatively connected to said cushion,
 (c) means to fire said generator and create inflation fluid,

(d) discharge ports in said generator directing flow of inflation fluid into said cushion, and (e) means coaxial with said generator to vent fluid directly therefrom and beyond said cushion and responsive to an increase in operating temperature, said venting means having a flexible web terminating in an axially extending rib fitting within the end of said generator and moveable substantially axially from that position closing the end of said generator to an open position in response to said increase.

* * * * *